Sept. 20, 1955 K. G. BRUNBERG 2,718,556

DEVICE FOR CONNECTION OF TANDEM OPERATORS IN AUTOMATIC TELEPHONE EXCHANGES

Filed May 24, 1950 2 Sheets-Sheet 1

Inventor
K. G. Brunberg
By [signature]
Attys.

Inventor
K. G. Brunberg
By Glascock Downing & Seebold
Attys.

United States Patent Office 2,718,556
Patented Sept. 20, 1955

2,718,556

DEVICE FOR CONNECTION OF TANDEM OPERATORS IN AUTOMATIC TELEPHONE EXCHANGES

Karl Gunnar Brunberg, Hagersten, Sweden, assignor to Telefonaktiebolaget L M Ericsson, Stockholm, Sweden, a company of Sweden Application May 24, 1950, Serial No. 163,915

Claims priority, application Sweden June 17, 1949

4 Claims. (Cl. 179—27)

The present invention relates to connecting devices used in automatic telephone exchanges for marking certain subscriber's lines so that calls to said subscriber's lines are automatically connected to a tandem position, where an operator answers the call.

The invention refers to automatic telephone exchanges having registers and markers, and consists in each marker, which sets the line selector, being provided with a control register at the said tandem position, and in a contact field pertaining to said control register, each one of the cross-points between the conductors where they cross each other corresponding to a subscriber's line, and said conductors being brought into contact with each other and marking a condition prevailing on the subscriber's line; said control register is set from said marker upon initiation of a call to a subscriber's line and connecting a circuit for a relay over two of the conductors crossing each other in said contact field, the crossing points of the conductors marking said subscriber's line, and said relay, when actuated, closing circuits which start a connecting process, in which a connection is established between the calling subscriber's line and a line connected to the operator's desk at the tandem position. The calling person can thus be connected with the tandem position by two connections to the called subscriber's line. One of said connections is between the calling and the called subscriber's lines, and the other one between the tandem position and the called subscriber.

The invention will be described more in detail below with reference to the accompanying drawings.

Figure 1:
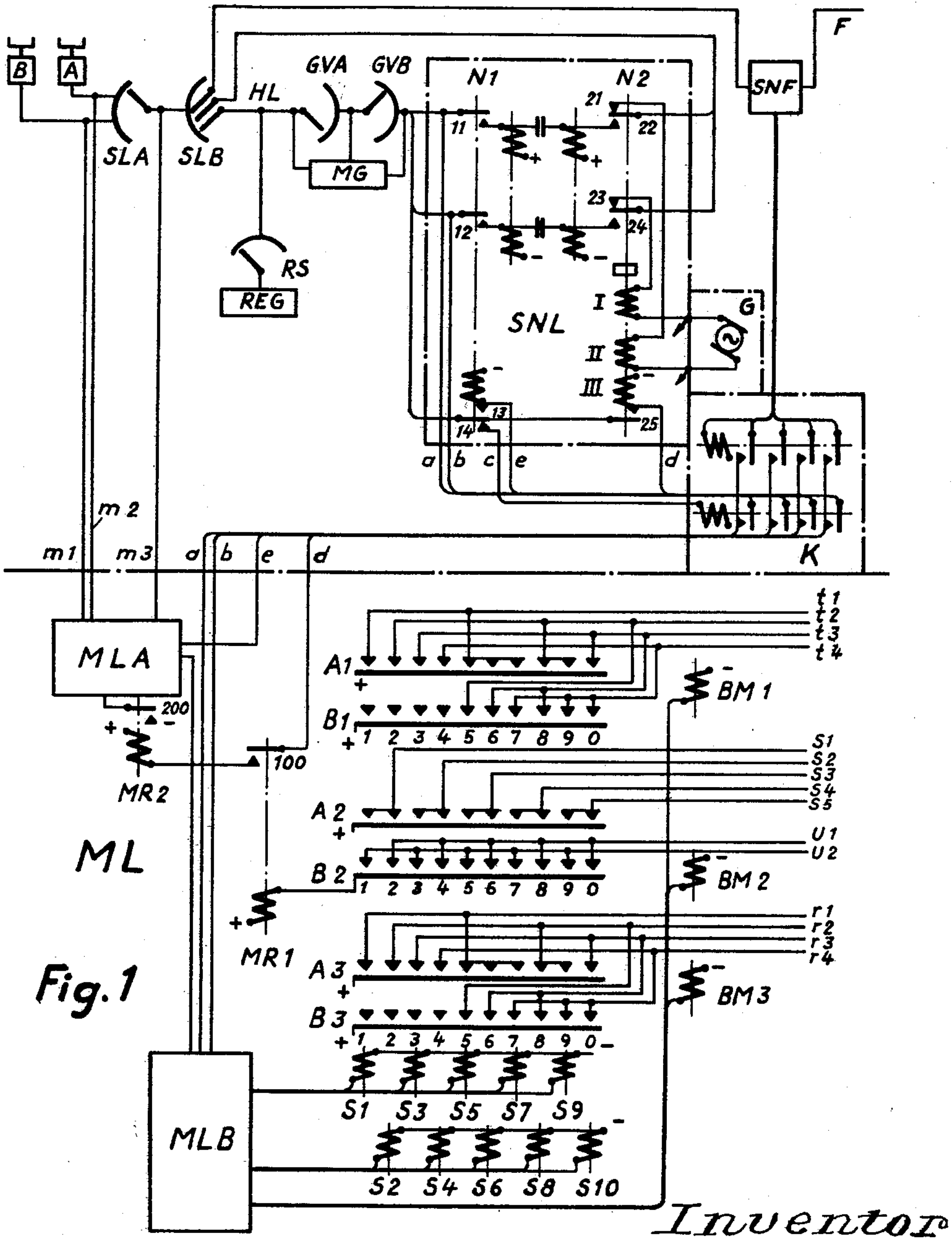
Figure 2:
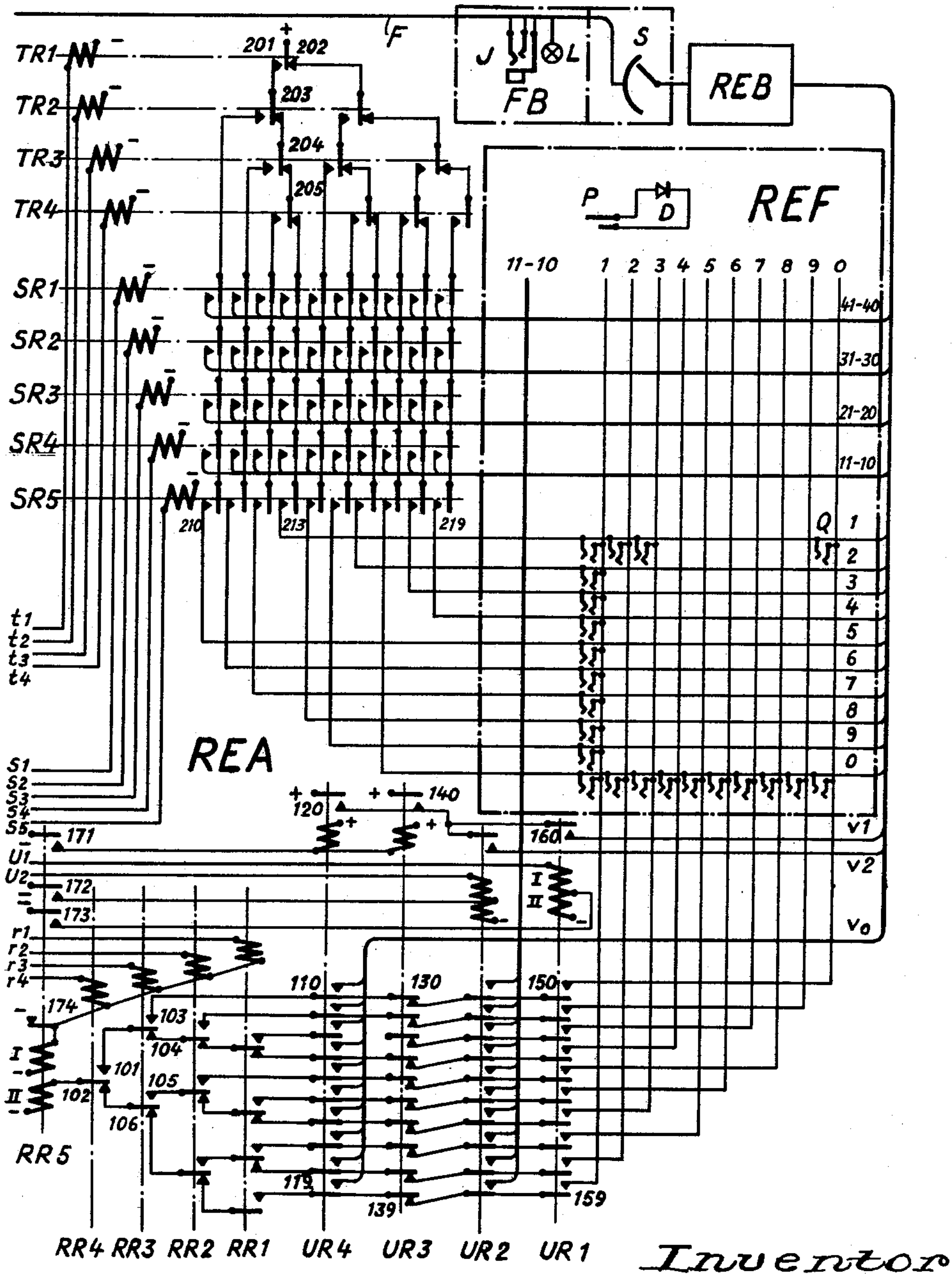

Fig. 1 shows the traffic paths within an automatic telephone exchange according to the invention and a marker ML, which sets a combined finder and line selection stage SLA—SLB. Fig. 2 shows a control register REA—REB with a contact field REF. Over a finder S the control register can select a free junction line F outgoing from the tandem position FB.

In Fig. 1, A and B are subscriber's instruments. Upon a call from the instrument A, said instrument is connected over the combined line finder and final selection stage SLA—SLB to a link HL, which is connected to a register REG over a register finder RS. The register is set by means of the dial of the calling instrument. Suppose now that the subscriber's instrument B is called. The register connects the link HL by means of the marker MG for the group selection stage GVA—GVB to a connecting link SNL connected over a contact device K to the marker ML for the combined line finder and final selection stage SLA—SLB.

The marker ML consists of two parts MLA and MLB, MLA comprising connecting relays and selecting relays for connection of calls from the subscriber's instruments A—B to the links HL and for connection of the connecting links SNL to the subscriber's instruments upon a call to said instruments. The two operating bars for crossbar switches A1—B1, A2—B2, A3—B3 shown in the figure pertain to MLB and are set by means of the selecting magnets S1—S10 in accordance with the number of the called subscriber. They are operated by the operating magnets BM1, BM2 and BM3.

When the group selecting device GVA—GVB makes busy the connecting link SNL the contact device K is actuated over wire *c*, whereafter the registering device MLB in the marker is set over wires *a* and *b*. The marker ML is connected to the control register over 15 wires *t*1–*t*4, *s*1–*s*5, *u*1–*u*2 and *r*1–*r*4 according to Fig. 2. Each wire is connected to a relay TR1–TR4, SR1–SR5, UR1–UR2 and RR1–RR4 in the control register, and the figure registration in the marker ML is transmitted to the control register by actuation of said relays in different combinations. By combining relays TR1–TR4 with SR1–SR5 fifty different groups of numbers are obtained, each having twenty subscriber's numbers which are selected by the relays RR1–RR4 combined with UR1 and UR2. Each one of the fifty groups of numbers has a horizontal conductor bar in the contact field REF and crosses twenty vertical conductor bars representing the twenty numbers within each group of numbers. The contact field thus comprises a first group of horizontal conductors and a second group of vertical conductors, crossing one another at a right angle. Sufficient conductors are provided so that the product of the numbers of conductors in the two groups equals the number of subscriber's lines, and each cross point therefore designates a particular one of the subscriber's lines.

Suppose that the called subscriber's instrument B has a number, the last three figures of which are 100, and that a plug P is inserted in the jack Q corresponding to said number. The horizontal bar 1 and the vertical bar 0 in the field REF of the jack are connected over a rectifier D. The following circuits are closed:

(*a*) +, contact bar A1 position 1, wire *t*1, winding on relay TR1 to negative.

(*b*) +, contact bar A2 position 0, wire *a*5, winding on relay SR5 to negative.

(*c*) +, winding on relay MR1, contact bar B2 position 0, wire *n*1, windings I and II on relay UR1 to negative.

(*d*) +, contact bar A3 position 0, wire *r*3, winding on relay RR3, contact 174 to negative.

(*e*) +, contact bar B3 position 0, wire *r*4, winding on relay RR4, contact 174 to negative.

The relays TR1, SR5, UR1, RR3 and RR4 attract. The contacts 201—202, 101—102, 103—106, 210—219 and 150—160 are operated. The following circuits are closed: +, contacts 201, 203, 204, 205 and 213, jack Q, contacts 150, 130, 103 and 101, winding II on signalling relay RR5 to negative. Relay RR5 attracts. The contacts 171—174 are actuated. Relay RR5 is hereafter kept with current through its winding I. Relays UR3 and UR4 attract. Contacts 110—120 and 130—140 are operated, the marking wires from relays RR1—RR4 thereby being switched from the jack field REF to the register part REG. Relays UR3 and UR4 thus constitute connecting means for the respective conductors making up the field of crossing conductor bars. The called subscriber's number is marked in REG in a manner known in partly automatic telephone systems by test on wires *v*1–*v*0 and the horizontal bars in the jack field REF connected to REB.

The register part REB, which constitutes a controlling means for a finder at the tandem position, starts a finder S, which selects a free connection L between the tandem position FB and the combined line finder and final selection stage SLA—SLB over which the called subscriber can be reached. A lamp L near by jack J is hereby lit in the tandem position FB and the operator at the operator's desk in said tandem position connects herself in the circuit by means of a link.

Simultaneously with the register part REB registering the subscriber's number, the marker ML in Fig. 1 sets up a connection between the calling and the called subscribers. When relay RR5 in Fig. 2 actuates the contacts 172 and 173, the winding II on relay UR1 is shortcircuited. Said winding has a high resistance, and therefore the current intensity through relay MR in Fig. 1 increases so that relay MR1 attracts. Contact 100 is actuated. Relay N2 is thereby actuated by its winding III in the connecting link SNL over wire *d*, but relay MR2 in the marker cannot attract in this case. The contacts 21—25 are actuated. The ringing generator G is shortcircuited by contacts 21 and 23 and the communication circuit is connected over contacts 22 and 24. Relay N2 is kept operated over contact 25 in dependence on the wire *c* of the connection. The registering device MLB in the marker actuates the connecting and selecting relays in MLA, which select a link between the primary and secondary selectors SLA and SLB and connect the connecting link SNL with the subscriber's instrument B. Relay N1 is thereafter actuated in the connecting link. The contacts 11–14 are actuated. The communication circuit is set over contacts 11 and 12 and relay N1 is kept operated over contact 13. Contact 14 releases the contact device K and the marker ML.

Only hereafter can the register, part REB in Fig. 2 set up the connection between the operator's desk at the tandem position FB and the subscriber's instrument B. The trunk line F is provided with an equipment SNF, which can be connected to the marker ML over the contact device K. The marker ML is set by the register part REB and connects the trunk line F with the subscriber's instrument B over the selection stage SLA–SLB. The subscriber's instrument B is however marked busy by the previously described connections and a special signal is therefore required to cause the marker ML to set the talking connection in spite of the busy marking. This signal is received from the equipment SNF in such a manner, that negative is connected to wire *d* in SNF, the current intensity through relay MR2 thereby becoming sufficiently great for actuation of relay MR2. Contact 200 is actuated and transmits the signal to the selecting relays in MLA.

The connecting relays in the contact device K are operated by a relay chain made so that a call from a trunk line F has the precedence before a simultaneous call from a link SNL.

The calling subscriber's instrument A is hereafter connected to the tandem position FB over the combined line finder and final selection stage SLA–SLB, a link HL, the group selection stage GVA–GVB, a connecting link SNL, the selection stage SLB–SLA, connection of the subscriber's instrument B, the selection stage SLA–SLB, the tandem line F with its equipment SNF and the jack J.

The connecting device described above can be used not only for tandem connections, but also for answering calls to unoccupied numbers or occasionally cut off subscriber's lines.

According to one embodiment of the invention, the signal to relay MR1 in the marker ML may be omitted and the ringing signal from the connecting link SNL broken by an answering signal over the line F. We presuppose then that a ringing signal to the called subscriber is desirable or at least unobjectionable.

The connecting device can be considerably simplified by arranging one or several lines to the tandem position for each group of selectors SLA–SLB. The line F is hereby connected as a subscriber's line to a selector SLA. The equipment REB in Fig. 2 with the finder S and the connecting link SNF in Fig. 1 as well as its connecting relay in the contact device K will then be eliminated. Instead, the actuation of relay MR1 in Fig. 1 causes the connection set by the marker ML to be directed to the line F instead of to the called subscriber's line. If one line per group is not sufficient for the tandem traffic, selection is arranged over several lines F, the marker ML thereby switching the calls to a P. B. X.-number reserved for the tandem position.

I claim:

1. In an automatic telephone system, a number of subscriber's lines, links and selectors for the connection of calls to said lines, a marker for setting said selectors, registering means in said marker, means for connecting said links to said marker and means for setting said registering means to designate a called subscriber's line, a contact field having a number of conductors forming a first group and a number of conductors forming a second group arranged to cross each other, the product of said last two numbers corresponding to the said number of subscriber's lines and each cross-point designating a subscriber's line, an operator's desk, a rectifier connected between one of said conductors in the first group and one of said conductors in the second group at the cross-point designating a particular subscriber's line in order to connect all calls to said line automatically with said operator's desk, transmitting means joining said registering means in the marker with said two groups of conductors for transmitting the designation of a called subscriber's line to said conductors, a signalling relay, a circuit for operating said relay closed in accordance with the registration in said marker of a registration which designates one of said marked lines, said circuit passing through said rectifier corresponding to the marked called line, connecting means operated by said relay, switching means, and controlling means connected to both said last-named means whereby said connecting means transmits the designation of said marked line to said controlling means and said controlling means sets said switching means to complete a connection between the calling line and said operator's desk.

2. In an automatic telephone system, a number of subscriber's lines, links and selectors for the connection of calls to said lines, a marker for setting said selectors, registering means in said marker, means for connecting said links to said marker and means for setting said registering means to designate a called subscriber's line, a jack field having a number of vertical conductors and a number of horizontal conductors arranged to cross each other and a jack connected across each cross-point between said conductors, one contact spring in said jack being connected to the vertical and one to the horizontal conductor of the cross-point, the product of said last two numbers corresponding to the said number of subscriber's lines and each jack and each cross-point designating a subscriber's line, an operator's desk, at least one of said subscriber's lines being marked by a plug in the corresponding one of said jacks in order to connect all calls to said line automatically with said operator's desk, said plug having two conductors connected by a rectifier, transmitting means connecting said registering means with said vertical and horizontal conductors, a signalling relay, a circuit for operating said relay closed in accordance with the registration in the marker which designates said marked line, said circuit passing through said plug and rectifier in the jack corresponding to the marked called line, connecting means operated by said relay, switching means, and controlling means connected to both said last-named means whereby said connecting means transmits the designation of said marked line to said controlling means and said controlling means sets said switching means to complete a connection between the calling line and said operator's desk.

3. An automatic telephone system as described in claim 1 in which said transmitting means contains a first set of relays contacts on which are connected to said first conductors, and a second set of relays contacts on which are connected to said second conductors in said field, and a number of trunks connecting said two sets of relays with said registering means in the marker, said relays being operated by signals over said trunks to close said circuit for said signalling relay.

4. An automatic telephone system as described in claim 2 in which said transmitting means contains a first set of relays, contacts on which are connected to the horizontal conductors and a second set of relays contacts on which are connected to the vertical conductors in said jack field, and a number of trunks connecting said two sets of relays with said registering means in the marker, said relays being operated by signals over said trunks to close said circuit for said signalling relay.

No references cited.